US008878889B1

(12) United States Patent
Kaupp et al.

(10) Patent No.: US 8,878,889 B1
(45) Date of Patent: Nov. 4, 2014

(54) METHOD AND SYSTEM FOR ORIGINATING AND RECEIVING EMERGENCY PUSH-TO-TALK CALLS

(75) Inventors: Bradford R. Kaupp, Denver, CO (US); Paul Reckell, Ocoee, FL (US)

(73) Assignee: Sprint Spectrum L.P., Overland Park, KS (US)

( * ) Notice: Subject to any disclaimer, the term of this patent is extended or adjusted under 35 U.S.C. 154(b) by 316 days.

(21) Appl. No.: 13/474,155

(22) Filed: May 17, 2012

(51) Int. Cl.
H04N 7/14 (2006.01)
H04M 11/00 (2006.01)
H04W 4/22 (2009.01)
H04W 76/00 (2009.01)

(52) U.S. Cl.
CPC .............. *H04W 4/22* (2013.01); *H04W 76/007* (2013.01)
USPC .......... 348/14.02; 455/404.1; 379/37; 379/40

(58) Field of Classification Search
CPC ..... H04W 4/22; H04W 76/007; H04M 11/00; H04M 2242/04; H04M 3/5116; H04M 2203/2044; H04M 1/72538; H04M 2207/18
USPC ............ 348/14.02; 455/404.1; 379/37, 40, 45
See application file for complete search history.

(56) References Cited

U.S. PATENT DOCUMENTS

| 5,551,062 | A | 8/1996 | Drozt et al. |
| 5,758,291 | A | 5/1998 | Grube et al. |
| 7,315,738 | B1 | 1/2008 | Delker et al. |
| 7,454,206 | B1 | 11/2008 | Phillips et al. |
| 7,565,434 | B1 | 7/2009 | Chaturvedi et al. |
| 7,577,426 | B1 | 8/2009 | Delker et al. |
| 7,787,879 | B1 | 8/2010 | Philips et al. |
| 7,865,205 | B1 | 1/2011 | Lundy et al. |
| 7,970,425 | B2 | 6/2011 | Balachandran et al. |
| 2006/0040694 | A1* | 2/2006 | Yoon et al. ..................... 455/519 |
| 2006/0105793 | A1 | 5/2006 | Gutowski et al. |
| 2006/0120516 | A1* | 6/2006 | Armbruster et al. ............ 379/37 |
| 2007/0276947 | A1* | 11/2007 | Panattu et al. ................. 709/227 |
| 2011/0237217 | A1 | 9/2011 | Monks et al. |
| 2011/0237287 | A1 | 9/2011 | Klein et al. |
| 2012/0026880 | A1 | 2/2012 | Miller et al. |
| 2012/0276941 | A1* | 11/2012 | Reich et al. .................... 455/518 |

OTHER PUBLICATIONS

"Motorola's new Solutions for Private iDEN Networks Provide Reliable Communications in Demanding Environments," PR Newswire, Apr. 13, 2009.
Motorola, Inc., "Motorola r765 and r765IS radio series," Specification Sheet, 2009.
Motorola, Inc., Manual Number: NNTN7655B, 2009.

* cited by examiner

Primary Examiner — Stella Woo

(57) ABSTRACT

A wireless communication device (WCD) that is configured to originate and receive push-to-talk (PTT) calls may be identified by a standard identifier in standard PTT calls and may be identified by an emergency identifier in emergency PTT calls. The WCD may be configured to recognize an emergency trigger and, in response to the emergency trigger, originate an outgoing emergency PTT call, using the emergency identifier. If, while engaged in a standard PTT call, the WCD receives an incoming emergency PTT call that includes the WCD's emergency identifier, the emergency PTT call may preempt the standard PTT call. For example, the WCD may convey audio from the emergency PTT call to a speaker or other audio output interface, instead of audio from the standard PTT call. The WCD may also release the standard PTT call.

19 Claims, 6 Drawing Sheets

METHOD AND SYSTEM FOR ORIGINATING AND RECEIVING EMERGENCY PUSH-TO-TALK CALLS

BACKGROUND

Many wireless communication devices are able to engage in a half-duplex form of wireless communication, using wireless networks, that is commonly known as "push-to-talk" (PTT) service. PTT service can provide a user experience that is, in many respects, similar to "walkie-talkie" communication with two-way radios.

In a typical implementation, an initiator interacts with a menu on the initiator's device to select a subscriber or group of subscribers as recipients of a PTT audio communication. To initiate a PTT audio communication, the initiator presses and holds a PTT button on the device. In response, the device wirelessly transmits signals to set up the connection. When the connection has been established, the device plays a tone or other readiness signal. At that point, the initiator may begin speaking. The initiator releases the PTT button when finished speaking. The initiator's PTT audio communication is conveyed through the network to the recipients' mobile stations. When a device receives the PTT audio communication, the device will typically generate an incoming audio indication (such as a beeping sound) and then play the initiator's audio message automatically through a speaker. After the initiator's PTT audio communication is played out, a recipient may press a PTT button on the recipient's device and begin speaking to send a responsive PTT audio communication.

OVERVIEW

In a first principal aspect, an exemplary embodiment provides a wireless communication device (WCD). The WCD comprises a wireless transceiver and a controller. The controller comprises a processor and data storage. The data storage stores a standard identifier and an emergency identifier. The controller is configured to: (a) recognize a standard push-to-talk (PTT) call request; (b) in response to the standard PTT call request, originate an outgoing standard PTT call, via the wireless transceiver, using the standard identifier to identify the WCD; (c) recognize an emergency trigger; and (d) in response to the emergency trigger, originate an outgoing emergency PTT call, via the wireless transceiver, using the emergency identifier to identify the WCD.

In a second principal aspect, an exemplary embodiment provides a method for a wireless communication device (WCD) that is operable to originate and receive push-to-talk (PTT) calls. The WCD registers a standard identifier and an emergency identifier using a PTT server. The WCD detects an emergency trigger and, in response to the emergency trigger, the WCD wirelessly transmits signaling to the PTT server to originate an outgoing emergency PTT call. The signaling includes the emergency identifier.

In a third principal aspect, an exemplary embodiment provides a method for a wireless communication device (WCD) that is operable to originate and receive push-to-talk (PTT) calls. The WCD registers a standard identifier and an emergency identifier using a PTT server. The WCD becomes engaged in a standard PTT call that identifies the WCD by the standard identifier. While engaged in the standard PTT call, the WCD receives an incoming emergency PTT call. The incoming emergency PTT call identifies the WCD by the emergency identifier. In response to the incoming emergency PTT call, the WCD wirelessly transmits signaling to the PTT server to release the standard PTT call.

DETAILED DESCRIPTION OF EXEMPLARY EMBODIMENTS

1. Introduction

Figure 1:
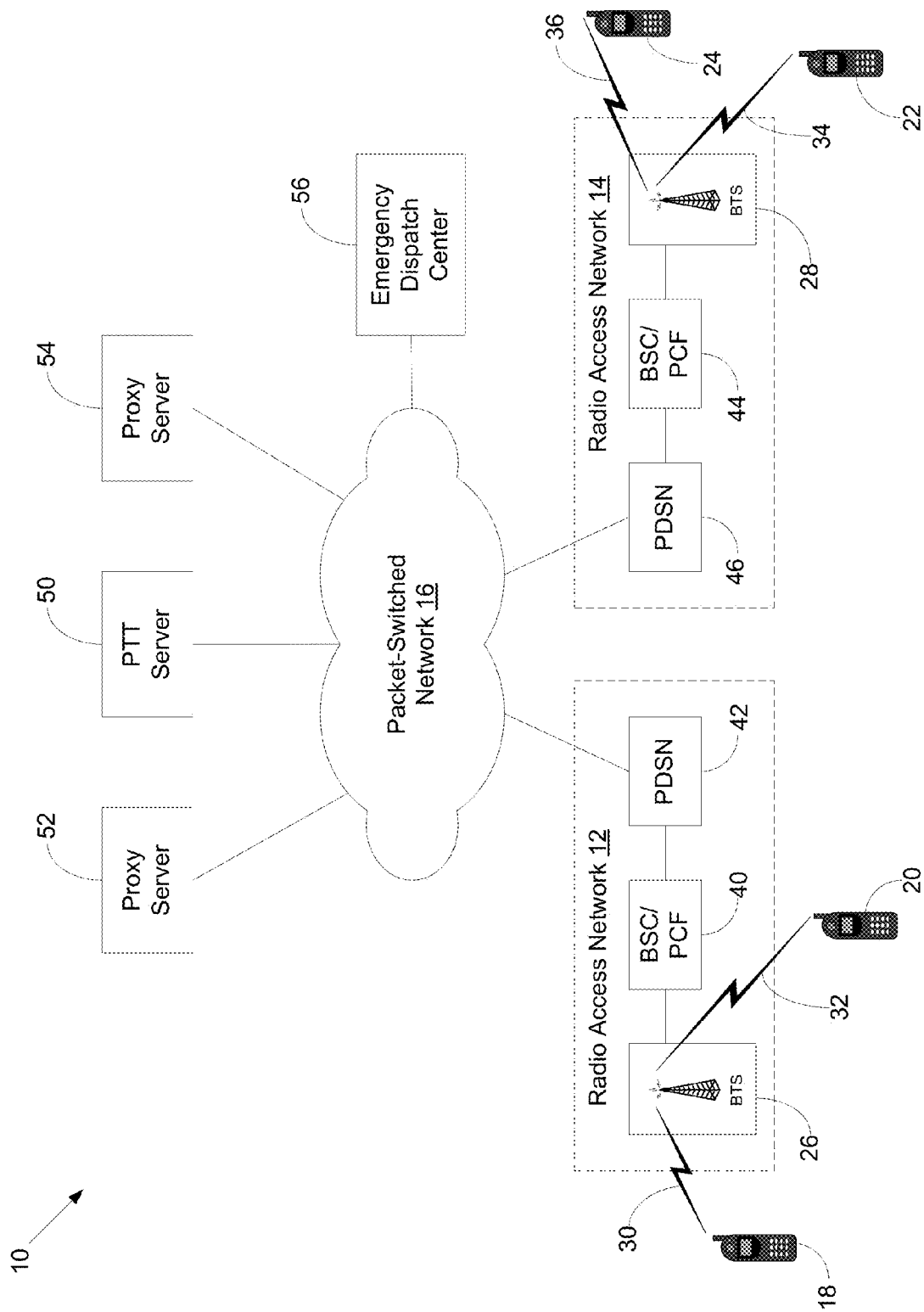
FIG. 1 is a simplified block diagram of a wireless telecommunications network, in accordance with an exemplary embodiment.

A wireless communication device (WCD) may be identified by different identifiers for different types of PTT calls. For example, a WCD may be identified by a standard identifier in standard PTT calls and may be identified by an emergency identifier in emergency PTT calls. When a WCD receives an incoming PTT call, the WCD may respond in different ways depending on whether the incoming PTT call identifies the WCD by its standard identifier or its emergency identifier. For example, if the incoming PTT call includes the WCD's standard identifier, the WCD may treat the incoming PTT call as a standard PTT call and provide a standard alert indication (which may involve an audio, visual, and/or tactile component). If the incoming PTT call includes the WCD's emergency identifier, the WCD may treat the incoming PTT call as an emergency PTT call and provide an emergency alert indication (which may involve an audio, visual, and/or tactile component). The WCD may also adjust a speaker volume to a high level (e.g., overriding a mute or low-volume setting) to play out audio that may be received in the incoming emergency PTT call.

In addition, an emergency PTT call may have priority over a standard PTT call. For example, while engaged in a standard PTT call, a WCD may receive an incoming emergency PTT call that identifies the WCD's emergency identifier. The WCD may respond such that the incoming emergency PTT call preempts the standard PTT call. Preemption of the standard PTT call by the emergency PTT call could involve the WCD playing audio from the emergency PTT call instead of audio from the standard PTT call. Alternatively or additionally, preemption of the standard PTT call by the emergency PTT call could involve the WCD releasing the standard PTT call in response to the incoming emergency PTT call.

A WCD may also be configured to originate standard PTT calls, in which the WCD is identified by its standard identifier, and to originate emergency PTT calls, in which the WCD is identified by its emergency identifier. A WCD may originate a standard PTT call in response to a standard PTT call request. A standard PTT call request could involve a user interaction with a user interface of the WCD. For example, a user may interact with a menu to select a destination for the standard PTT call (the destination could be a single device or a talk group that defines a group of devices) and then press a PTT call button on the WCD.

A WCD may originate an emergency PTT call in response to detecting an emergency trigger. The emergency trigger could involve a particular user interaction with the WCD. For example, the WCD may recognize an emergency trigger when the user actuates the PTT call button for at least a predetermined period of time (e.g., 3 seconds) without having first selected a destination for the PTT call. Alternatively or additionally, the WCD may recognize an emergency trigger when a different button on the WCD, such as a dedicated emergency button, has been actuated for at least a predetermined period of time.

A WCD may also recognize an emergency trigger in response to a condition that does not involve user input. For example, a WCD may recognize an emergency trigger based on the output of one or more sensors, which could be part of a sensor system in the WCD or could be external sensors that are communicatively coupled to the WCD (e.g., via a wireless link). As one possibility, a motion sensor could provide an output that indicates motion of the WCD. The WCD may recognize an emergency trigger for an emergency PTT call when the motion sensor indicates a sudden acceleration (such as may occur during a fall) or when the motion sensor indicates a lack of movement for a predetermined period of time. As another possibility, a biometric sensor may indicate a heart rate, breathing pattern, or other biometric data relating to a user. The WCD may recognize an emergency trigger based on the biometric data indicating that the user may be in danger. As still another possibility, the WCD may recognize an emergency trigger based on output from an environmental sensor (e.g., a chemical sensor or radiation sensor) indicating that the WCD is in a potentially dangerous environment. Other types of sensors and emergency triggers are also possible.

When a WCD originates an outgoing emergency PTT call, the WCD may originate the emergency PTT call to an emergency talk group. The emergency talk group could be a group of other WCDs, such as WCDs of other users that may be able to provide emergency assistance. The emergency talk group could also include one or more landline devices, such as may be in an emergency dispatch center. The emergency talk group could be registered in a PTT server as an association between an emergency talk group identifier and the emergency identifiers of the WCDs in the emergency talk group. Because of this association in the PTT server, when an emergency PTT call to the emergency talk group is originated, each WCD in the emergency talk group may receive an incoming PTT call that identifies the WCD by its respective emergency identifier. In this way, a WCD can recognize the incoming PTT call as an emergency PTT call and respond accordingly, such as by providing a user-discernible alert that indicates an emergency PTT call, adjusting the speaker volume level, and preempting any standard PTT call in which the WCD may be engaged.

2. Exemplary Network Architecture

FIG. 1 illustrates a wireless telecommunications network 10 in which exemplary embodiments may be employed. Network 10 may include one or more radio access networks (RANs), exemplified in FIG. 1 by RAN 12 and RAN 14, which provide wireless communication devices (WCDs) with wireless access to a packet-switched network 16. Such WCDs may include wireless telephones, wireless handheld computers, wireless personal digital assistants, wireless tablet computers, wirelessly-equipped laptop computers, and/or any other type of device that can send or receive wireless signals. For purposes of illustration, FIG. 1 shows WCDs 18 and 20 in wireless communication with RAN 12 and shows WCDs 22 and 24 in wireless communication with RAN 14. The wireless communications between a WCD and a RAN may involve the exchange of voice, video, text, data, and/or other media with one or more endpoints, such as other WCDs, landline telephones, e-mail servers, media servers, gaming servers, Web servers, or other devices that may be communicatively coupled to packet-switched network 16.

RAN 12 and RAN 14 may each include one or more wireless access points, such as base transceiver stations (BTSs), which may communicate with one or more WCDs using, for example, 1xRTT CDMA, EVDO, GSM/GPRS, WiFi (IEEE 802.11), WiMAX (IEEE 802.16), LTE, or any other type of wireless communications protocol. As shown, RAN 12 includes a BTS 26 and RAN 14 includes a BTS 28. Each of BTSs 26 and 28 may wirelessly communicate with one or more WCDs within a respective wireless coverage area (which may include a cell or one or more sectors). The wireless coverage areas provided by BTSs 26 and 28 could be non-overlapping, partially overlapping, co-extensive, or one wireless coverage area could be fully encompassed within the other. For purposes of illustration, FIG. 1 shows WCDs 18 and 20 in communication with BTS 26 via respective air interfaces 30 and 32, and also shows WCDs in communication with BTS 28 via respective air interfaces 34 and 36. It is to be understood that this arrangement is exemplary only, as a BTS may wirelessly communicate with a greater or fewer number of WCDs and each RAN may include a plurality of BTSs.

The one or more BTSs in a RAN may be controlled by one or more base station controllers (BSCs), which may include packet control functions (PCFs). The BSCs may, in turn, be communicatively coupled to packet-switched network 16 via one or more packet data serving nodes (PDSNs). As shown in FIG. 1, BTS 26 is coupled to BSC/PCF 40, which is coupled to PDSN 42, and BTS 28 is coupled to BSC/PCF 44, which is coupled to PDSN 46. PDSNs 42 and 46 may provide RANs 12 and 14, respectively, access to packet-switched network 16.

Packet-switched network 16 may include a wide area network, such as the Internet, that routes packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 16 in a real-time format. Other protocols, such as the Session Initiation Protocol (SIP), may be used to set up and/or manage communication sessions through packet-switched network 16.

Such communication sessions may include push-to-talk (PTT) calls involving two or more WCDs. For example, a device-to-device PTT call could involve WCD 18 and WCD 24. A group PTT call could, for example, WCDs 18, 20, 22, and 24. During a PTT call, the WCDs are able to communicate one at a time (half-duplex communication), e.g., as if the WCDs were "walkie-talkie" radios. For example, an initiator may press a PTT button on the initiator's WCD and begin talking so that the initiator's speech is conveyed (with some latency) to the one or more other WCDs involved in the PTT call. To facilitate such PTT calls, wireless telecommunications system 10 may include a PTT server 50 that is communicatively coupled to packet-switched network 16.

PTT server 50 may serve as the anchor point for the signaling used to set up PTT calls and for the media streams that are conveyed during a PTT call. WCDs 18, 20, 22, and 24 may each include a PTT client for communicating with PTT server 50. The communication between PTT server 50 and a PTT client in a WCD may use an open standard protocol, such as SIP, or a proprietary protocol, such as QChat.

For example, to originate a PTT call, an originating WCD may transmit a SIP INVITE message to PTT server 50. The SIP INVITE message identifies the originating WCD and identifies a destination for the PTT call. The destination could be a single WCD, a talk group that includes multiple WCDs, or some other type of destination. The SIP INVITE message may also include a description of the requested PTT call, for example, using the Session Description Protocol (SDP). The PTT server 50 may receive the SIP INVITE message and then transmit one or more corresponding SIP INVITE messages to the one or more destination WCDs. In this way, a media stream may be established between PTT server 50 and the originator WCD, and one or more media streams may be established between PTT server 50 and the one or more destination WCDs, with PTT server 50 conferencing the various media streams together. Each media stream may include voice, video, or other media in a packetized format, for example, using the Real-time Transport Protocol (RTP).

Communications between PTT server 50 and a WCD may occur via one or more intermediate network elements. For example, the signaling between an originating WCD and PTT server 50 may be conveyed via one or more proxy servers, and the signaling between PTT server 50 and the one or more destination WCDs may be conveyed via one or more proxy servers. In an exemplary embodiment, each proxy server serves a particular area. For example, RAN 12 may be served by a proxy server 52, and RAN 14 may be served by a proxy server 54.

As described in more detail below, the PTT calls established using PTT server 50 may include standard PTT calls and emergency PTT calls. PTT server 50 may establish emergency PTT calls differently than standard PTT calls. As one example, PTT server 50 may establish emergency PTT calls in a higher priority fashion, using different resources, and/or different session descriptions, as compared to standard PTT calls. As another example, PTT server 50 may automatically set up an emergency PTT call so as to involve one or more entities, such as an emergency dispatch center 56, for purposes of recording or monitoring the call.

The use of emergency identifiers that are distinct from standard identifiers can facilitate different treatment for emergency PTT calls as compared to standard PTT calls. For example, the PTT server 50 may determine whether a requested PTT call is a standard PTT call or an emergency PTT call based on whether the originating WCD is identified by its standard identifier or by its emergency identifier in the SIP INVITE message or other signaling used to request the call. For a standard PTT call, PTT server 50 may send a SIP INVITE message to a destination WCD that identifies the destination WCD by its standard identifier. For an emergency PTT call, PTT server 50 may send a SIP INVITE message to a destination WCD that identifies the destination WCD by its emergency identifier.

3. Exemplary Identifiers

The standard identifiers and emergency identifiers that are included in SIP messages could be Uniform Resource Identifiers (URIs). Thus, a standard identifier could be in the form of sip:userid_std@domain and an emergency identifier could be in the form of sip:userid_emr@domain. The "userid" field could be the name, nickname, telephone number, or other identifier of a user associated with a WCD, the "domain" could be a domain name associated with a wireless service provider with which the user subscribes, and the "std" and "emr" strings could be used to indicate standard and emergency identifiers, respectively. It is to be understood that this format is exemplary only, as other formats for standard and emergency identifiers could be used.

A WCD may register its standard identifier and emergency identifier, for example, by sending one or more SIP REGISTER messages to a PTT server. The registration process may associate the WCD's standard and emergency identifiers with an IP address that routes to the WCD. With reference to FIG. 1, WCDs 18, 20, 22, and 24 may register their respective standard identifiers and emergency identifiers using PTT server 50. The resulting registrations may be as shown below in Table 1:

TABLE 1

| URI | IP address |
| --- | --- |
| sip:user18_std@sprint.com | 21.57.189.171 |
| sip:user18_emr@sprint.com | 21.57.189.171 |
| sip:user20_std@sprint.com | 21.57.189.172 |
| sip:user20_emr@sprint.com | 21.57.189.172 |
| sip:user22_std@sprint.com | 21.57.189.173 |
| sip:user22_emr@sprint.com | 21.57.189.173 |
| sip:user24_std@sprint.com | 21.57.189.174 |
| sip:user24_emr@sprint.com | 21.57.189.174 |

In the example of Table 1, "user18" identifies a user associated with WCD 18, "user20" identifies a user associated with WCD 20, etc. As described above, "std" indicates a standard identifier, whereas "emr" indicates an emergency identifier. It is to be understood, however, that other ways of distinguishing standard and emergency identifiers could be used. Further, in the example of Table 1, the standard and emergency identifiers for a given WCD are associated with the same IP address. In other examples, however, the standard and emergency identifiers for a given WCD could be associated with different IP addresses, port numbers, or types of other routing information. The registration information shown in Table 1 could be stored in PTT server 50. Alternatively, the registration information could be stored in another network element that can be accessed by PTT server 50.

A WCD may also register one or more talk groups, for example, by transmitting one or more SIP REGISTER messages to a PTT server. Each talk group may be a URI that is associated with the URIs of the particular WCDs or other destinations (e.g., an emergency dispatch center). Such talk groups may include emergency talk groups as well as other types of talk groups. With reference to FIG. 1, WCD 18 may register an emergency talk group that includes WCDs 20, 22, and 24. The emergency talk group of WCD 18 may be identified by a URI, such as sip:emr18_group@sprint.com, and may be associated with the emergency identifiers of WCDs 20, 22, and 24, i.e., sip:user20_emr@sprint.com, sip:user22_emr@sprint.com, and sip:user24_emr@sprint.com. WCDs 20, 22, and 24 may also register respective emergency talk groups. The talk group registrations may be stored in PTT server 50 or in another network element that can be accessed by PTT server 50.

4. Exemplary Methods

FIGS. 2-5 illustrate exemplary methods involving emergency PTT calls. For purposes of illustration, the methods are described with reference to wireless telecommunications network 10 shown in FIG. 1. It is to be understood, however, that other network architectures could be used. In addition, these exemplary methods are described with reference to SIP signaling. It is to be understood, however, that other protocols could be used.

Figure 2:
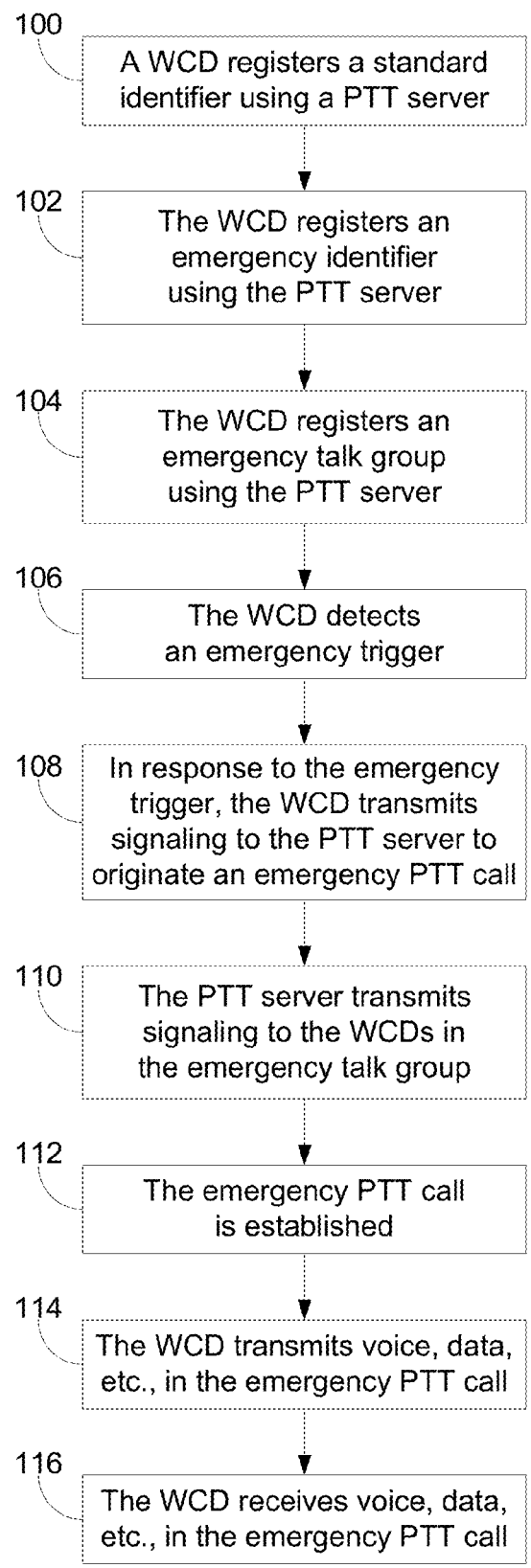
FIG. 2 is a flowchart of a method in which an emergency PTT call is established in response to an emergency trigger, in accordance with an exemplary embodiment.

FIG. 2 illustrates an example in which a WCD originates an emergency PTT call after detecting an emergency trigger. In this example, the method begins with a registration process, which the WCD may undertake before detecting any emergency trigger (e.g., when the WCD powers up). As part of this registration process, a WCD (e.g., WCD 18) may register a standard identifier using a PTT server (e.g., PTT server 50), an emergency identifier using the PTT server, and an emergency talk group using the PTT server, as indicated by blocks 100, 102, and 104. The standard identifier, emergency identifier, and emergency talk group could be URIs, for example, in the form described above. This registration process may associate the WCD's standard identifier and emergency identifier with an IP address that routes to the WCD, for example, in the manner illustrated above in Table 1. This registration process may also associate the emergency talk group with the emergency identifiers of the individual WCDs that are in the emergency talk group (e.g., WCDs 20, 22, and 24).

To effect these registrations, the WCD may send one or more SIP REGISTER messages to the PTT server. The WCD may send the SIP REGISTER messages at various times. For example, when a PTT client in WCD 18 is activated while it is being served by RAN 12, WCD 18 may send a SIP REGISTER message to PTT server 50 to register its standard identifier, its emergency identifier, and the emergency talk group. If WCD 18 subsequently roams to RAN 14 and is assigned a new IP address, WCD 18 may send another SIP MESSAGE to PTT server 50 register its standard and emergency identifiers with the new IP address (the registration of the emergency talk group could remain unchanged).

Sometime after this registration process, the WCD may detect an emergency trigger, as indicated by block 106. The emergency trigger could be detected, for example, when a user presses and holds a button on the WCD for at least a predetermined period of time (e.g., 3 seconds), when the WCD detects some other predetermined interaction with an input device on the WCD, or when the WCD detects a predetermined output from a sensor system (which may include a motion sensor, biometric sensor, radiation sensor, chemical sensor, and/or other type of sensor). Other types of emergency triggers are also possible.

In response to the emergency trigger, the WCD transmits signaling to the PTT server to originate an emergency PTT call, as indicated by block 108. The signaling could include, for example, a SIP INVITE message. To indicate that an emergency PTT call is requested, the signaling may identify the emergency identifier that the WCD previously registered and the emergency talk group that the WCD previously registered. Other ways of indicating that an emergency PTT call is being requested are also possible.

In response to the request from the WCD, the PTT server may transmit signaling to the WCDs in the emergency talk group, as indicated by block 110. The signaling may identify the emergency identifiers of the WCDs in the emergency talk group. For example, the PTT server may transmit to each WCD in the emergency talk group a respective SIP INVITE message that identifies that WCD's emergency identifier as the destination.

If the signaling is successful, the emergency PTT call may be established, as indicated by block 112. The WCD may then begin transmitting voice, data, or other media in the emergency PTT call, as indicated by block 114. For example, the WCD may activate an audio input interface (which may include or be a coupled to a microphone) that is configured to receive audio and transmit the audio received by the audio input interface in the emergency PTT call. In this way, the WCD may convey voice from the user to the emergency talk group, even if the user is unable to press the PTT button that is normally used to send audio in a PTT call. In some embodiments, the WCD may activate the audio input interface in response to detecting the emergency trigger. The WCD may then record the audio until the emergency PTT call is established and then convey the recorded audio to the emergency talk group once the emergency PTT call is established.

In addition to transmitting audio, the WCD could transmit other media. For example, in response to the emergency trigger, the WCD could activate a camera to capture video or still images and then convey the captured video or still images in the emergency PTT call. The WCD could also transmit data in the emergency PTT call. For example, the WCD could obtain a current location in response to the emergency trigger and include that current location in the emergency PTT call. To obtain the current location, the WCD could use a satellite-based positioning system (such as GPS), a terrestrial-based positioning system, an inertial navigation system, or other type of location determination system. The WCD could also transmit other types of data during the emergency PTT call.

The WCD could also receive voice, data, or other media in the emergency PTT call, as indicated by block 116. In this way, the members of the emergency talk group may be able to engage in voice communication with the user of the WCD that originated the emergency PTT call, for example, to ask how the user is doing or to ask the user what happened. The emergency talk group could also send textual instructions, maps, or other data to the originating WCD.

It is to be understood that the method shown in FIG. 2 is exemplary only, as emergency PTT calls could be established in other ways and/or other under other conditions. For example, instead of an outgoing emergency PTT call identifying a previously-registered emergency talk group as the destination, other types of destinations could be identified. In particular, an outgoing emergency PTT call could identify a single WCD as the destination or could identify a device other than a WCD as the destination, such as emergency dispatch center 56. As another example, an outgoing emergency PTT call might not identify a specific destination. In that case, the PTT server may select a default destination for the emergency PTT call. The default destination could be, for example, emergency dispatch center 56.

Figure 3:
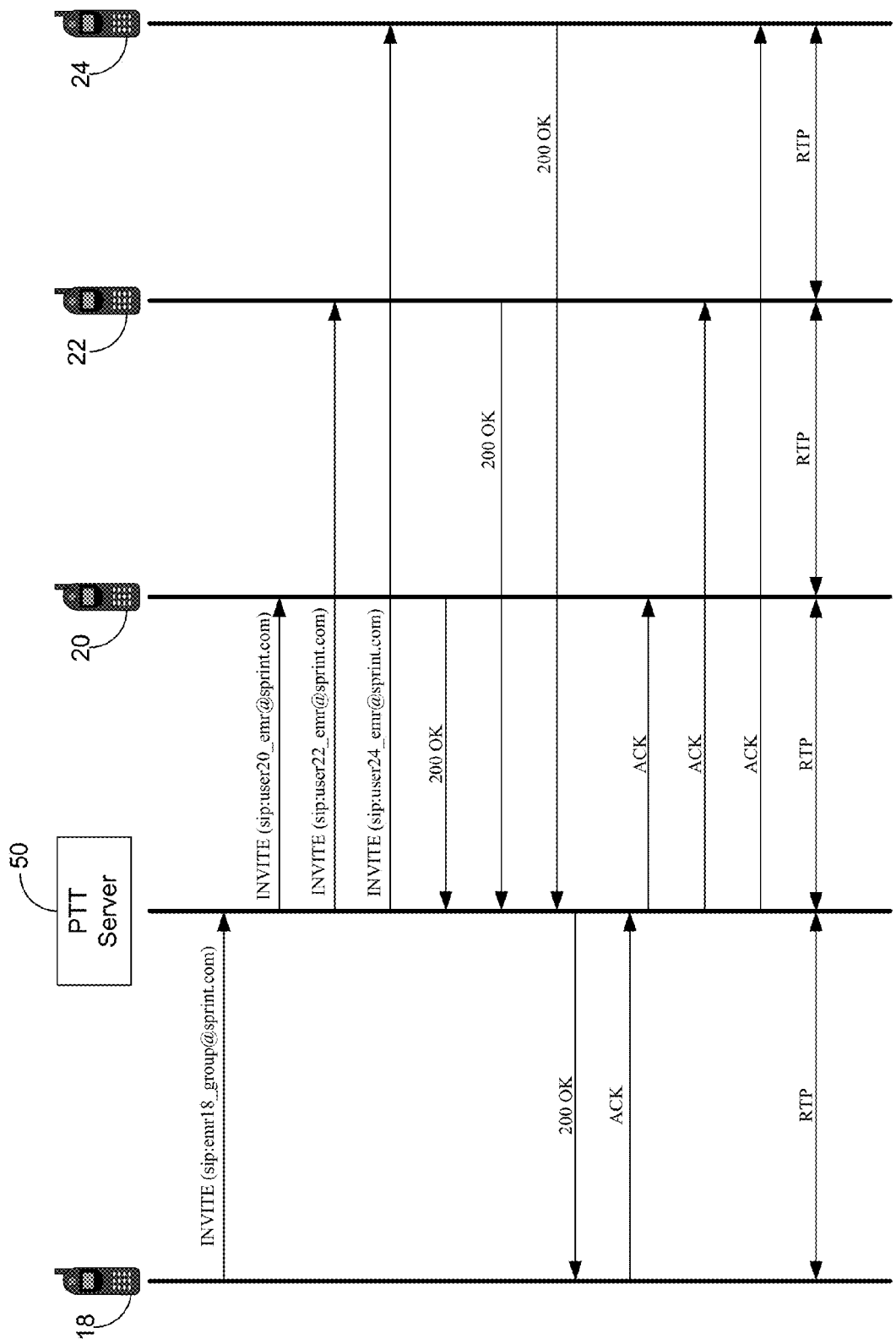
FIG. 3 is a call flow for establishing an emergency PTT call, in accordance with an exemplary embodiment.

FIG. 3 illustrates an exemplary call flow that may be used to establish an emergency PTT call, such as described above for blocks 108-112 of FIG. 2. As shown in FIG. 3, WCD 18 requests the emergency PTT call by transmitting a SIP INVITE message to PTT server 50. The SIP INVITE message identifies the emergency talk group "sip:emr18_group@sprint.com" as the destination, for example, in the "To:" field of the message. The SIP INVITE message may also identify WCD 18 by its emergency identifier "user18_emr@sprint.com" in the "From:" field of the message.

PTT server 50 receives the SIP INVITE message and maps the emergency talk group to the emergency identifiers of WCDs 20, 22, and 24 (which could be as shown above in Table 1), based on the information that has been previously registered for this emergency talk group. Thus, PTT 50 sends individual SIP INVITE messages to WCDs 20, 22, and 24, identifying the destinations as "sip:user20_emr@sprint.com" as the emergency identifier registered for WCD 20, "sip:user22_emr@sprint.com" as the emergency identifier registered for WCD 22, and "sip:user24_emr@sprint.com" as the emergency identifier registered for WCD 24.

WCDs 20, 22, and 24 may respond to these SIP INVITE messages by sending 200 OK messages to PTT server 50, as shown. PTT server 40 may then send a 200 OK message to WCD 18, which responds with an ACK message. PTT server 50 then sends ACK messages to WCDs 20, 22, and 24. At this point, the emergency PTT call is established, and WCDs 18, 20, 22, and 24 may exchange voice or other media through PTT server 50, for example, using RTP.

Figure 4:
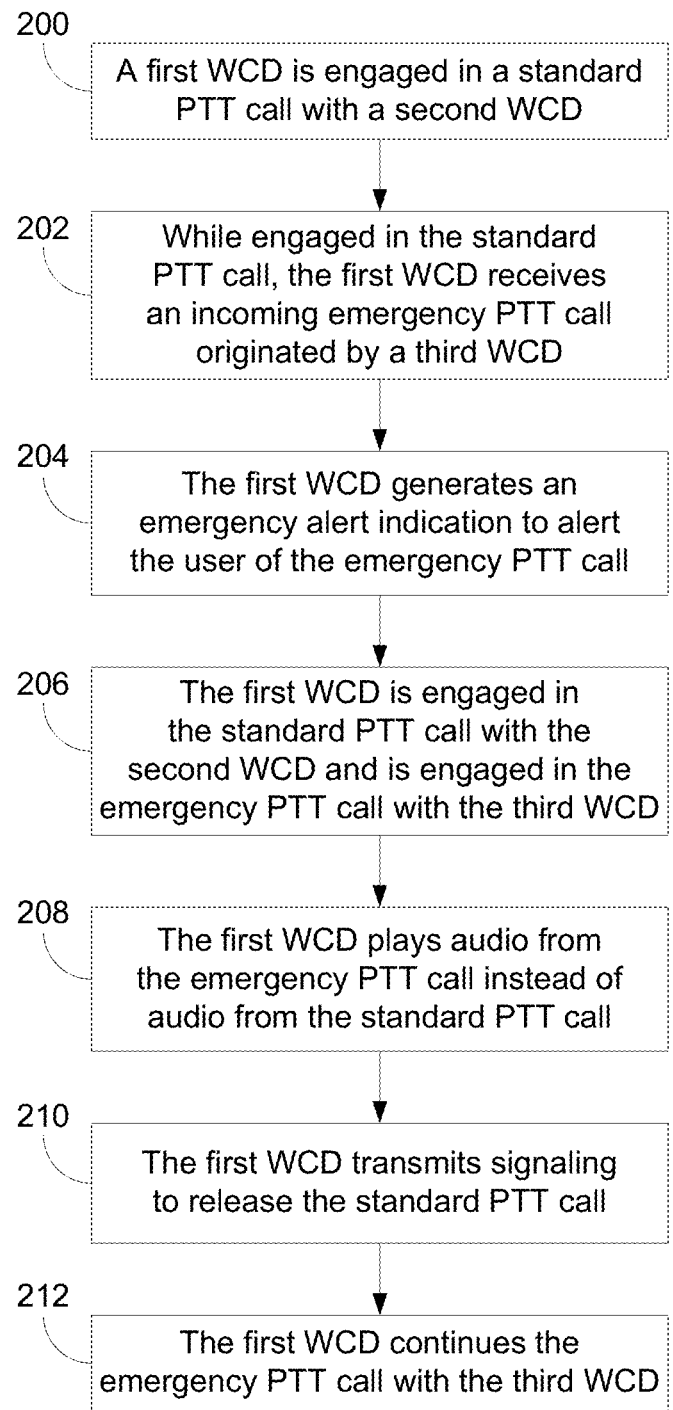
FIG. 4 is a flowchart of a method in which an incoming emergency PTT call preempts a standard PTT call, in accordance with an exemplary embodiment.

As noted above, when an emergency PTT call is established to a WCD, the emergency PTT call may preempt a standard PTT call in which the WCD is already engaged. FIG. 4 illustrates an example of an emergency PTT call that preempts a standard PTT call. In this example, a first WCD (e.g., WCD 18) is engaged in a standard PTT call with a second WCD (e.g., WCD 20), as indicated by block 200.

While engaged in the standard PTT call, the first WCD receives an incoming emergency PTT call that is originated by a third WCD (e.g., WCD 24), as indicated by block 202. For example, the first WCD may receive a SIP INVITE message that identifies the first WCD by its emergency identifier. The emergency PTT call may be a call to an emergency talk group that includes the first WCD. In general, the second WCD could also be included in the emergency talk group but is assumed not to be in this example, for purposes of illustration.

The first WCD may accept the incoming emergency PTT call and generate an emergency alert indication to alert the user of the emergency PTT call, as indicated by block 204. The emergency alert indication could be any user-discernible indication. Thus, the emergency alert indication could include an audio component (such as a tone played through a speaker), a visual component (such as a flashing light), and/or a tactile component (such as a vibration). In addition, the emergency alert indication could be different from a standard alert indication that the first WCD generates to alert the user of a standard PTT call.

At this point the first WCD is engaged in both the standard PTT call with the second WCD and the emergency PTT call with the third WCD, as indicated by block 206. Consequently, the first WCD may receive audio from both the standard PTT call and the emergency PTT call. In that situation, the first WCD may play the audio from the emergency PTT call instead of the audio from the standard PTT call, as indicated by block 208. For example, the first WCD may reserve its audio output interface (which could include a speaker or a wireless connection to a separate speaker device) for audio received in the emergency PTT call. The audio received from the standard PTT call could be recorded for later playback, or it could be simply discarded.

The first WCD may also disengage from the standard PTT call. For example, the first WCD may transmit signaling to release the standard PTT call, as indicated by block 210. Once the standard PTT call is released, the first WCD may continue the emergency PTT call with the third WCD, as indicated by block 212. This could involve the first WCD transmitting audio and/or other media to the third WCD and the first WCD receiving audio and/or other media from the third WCD.

Figure 5:
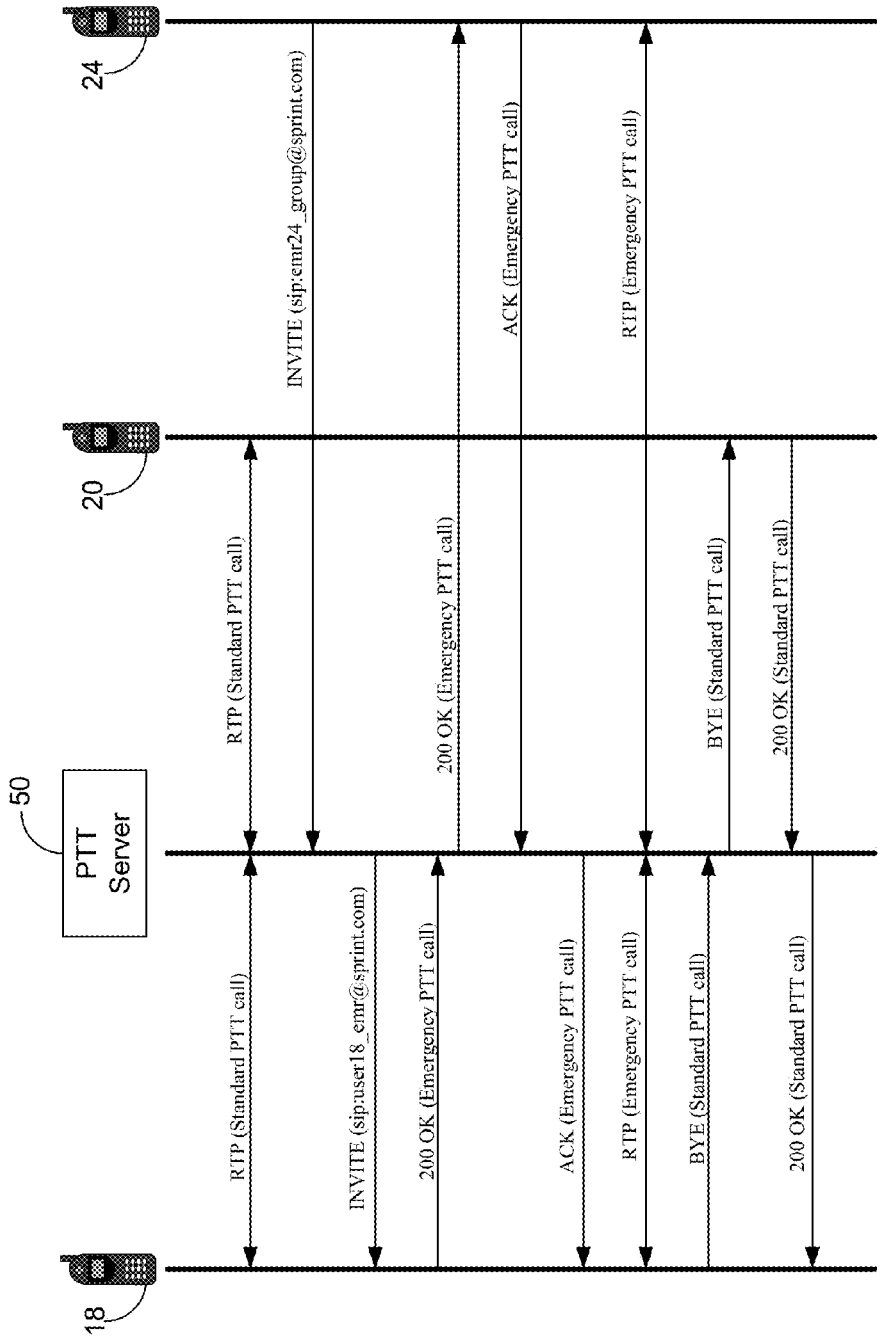
FIG. 5 is a call flow for establishing an emergency PTT call to a wireless communication device that is engaged in a standard PTT call, in accordance with an exemplary embodiment.

FIG. 5 is a call flow illustrating an example of how SIP signaling may be used to establish the emergency PTT call and release the standard PTT call in the scenario described above for FIG. 4. Initially, the first WCD (i.e., WCD 18) and the second WCD (i.e., WCD 20) are engaged in a standard PTT call. This is indicated in FIG. 5 by the RTP streams for the standard PTT call that are shown between WCD 18 and PTT 50 and between WCD 20 and PTT 50. To request an emergency PTT call, the third WCD (i.e., WCD 24) transmits a SIP INVITE message to PTT server 50. The SIP INVITE message identifies the destination as the emergency talk group "sip:emr24_group@sprint.com" which WCD 24 has previously registered using PTT server 50. Based on this registration, PTT server 50 maps the emergency talk group to the emergency identifier of WCD 18, which is "sip:user18_emr@sprint.com" in this example. It is to be understood that the emergency talk group could also include other WCDs that are not shown in FIG. 5. However, this example assumes that WCD 20 is not a part of the emergency talk group.

To set up the emergency PTT call, PTT server 50 sends a SIP INVITE message to WCD 18 that identifies WCD 18 by its emergency identifier. From this SIP INVITE message, WCD 18 recognizes an incoming emergency PTT call and may generate an emergency alert indication, as described above. To accept the incoming emergency PTT call, WCD 18 sends a 200 OK message to PTT server 50. PTT server 50 then sends a 200 OK message to WCD 24. WCD 24 responds with an ACK message, and PTT server 50 sends an ACK message to WCD 18. At this point, the emergency PTT call is established, as indicated by the RTP stream between WCD 18 and PTT server 50 and the RTP stream between WCD 24 and PTT server 50.

WCD 18 may also release the standard PTT call. To do so, WCD 18 may send a SIP BYE message to PTT server 50, and PTT server 50 may, in turn, send a SIP BYE message to WCD 20. To complete the release of the standard PTT call, WCD 20 may send a 200 OK message to PTT server 50, and PTT server 50 may send a 200 OK message to WCD 18.

5. Exemplary WCD

Figure 6:
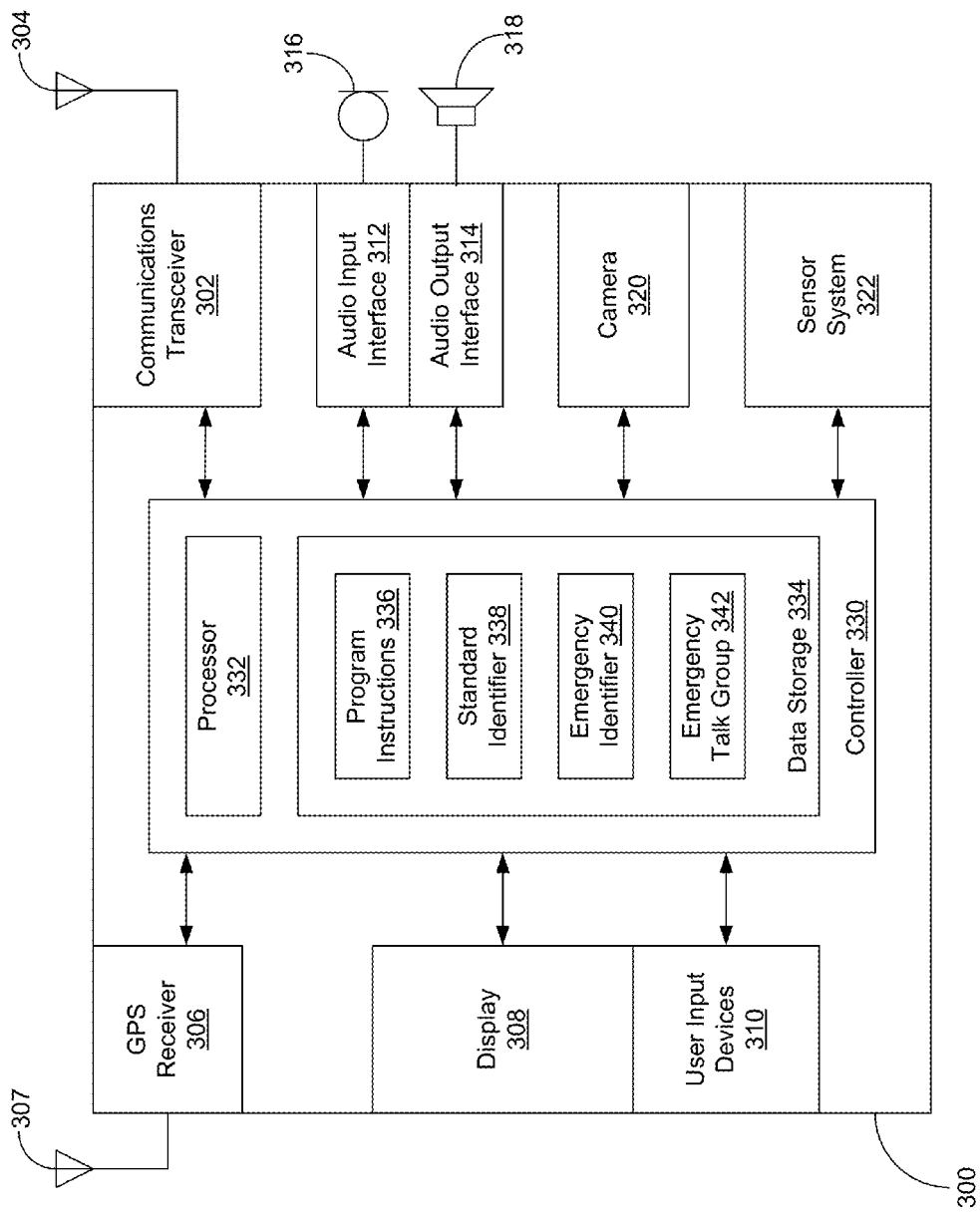
FIG. 6 is a block diagram of a wireless communication device, in accordance with an exemplary embodiment.

FIG. 6 illustrates an exemplary WCD 300 that may function in accordance with the methods described above and illustrated in FIGS. 2-5. WCD 300 may include a communications transceiver 302 for wirelessly communicating with a RAN (e.g., RAN 12), via one or more antennas, exemplified in FIG. 6 by antenna 304. WCD 300 may also include a GPS receiver 306 for receiving GPS signals, via an antenna 307, from which WCD 300 may determine its location.

WCD 300 may include a user interface that allows a user to interact with WCD 300. The user interface may include a display 308 that is able to display text and/or graphics. The user interface may also include user input devices 310 that are able to receive input from the user. As one example, user input devices 310 may include a touch screen that overlays display 308. Alternatively, user input devices 310 could include one or more buttons. The buttons could be in the form of a numeric or alphanumeric keypad. The buttons could also include a PTT call button that is configured to generate a request for a standard PTT call upon actuation. The PTT call button could also be configured to generate an emergency trigger when it is held down for a predetermined period of time (such as 3 seconds). Alternatively, user input devices 310 could include a separate emergency button that is configured to generate an emergency trigger.

WCD 300 may also be configured to receive and to play out voice or other audio. Thus, WCD 300 may include an audio input interface 312 that is configured to receive audio and an audio output interface 314 that is configured to output audio. Audio input interface 312 could include a microphone 316. Alternatively, microphone 316 could be physically separate from WCD 300 and communicatively coupled to audio input interface 312 via a wired or wireless link. Audio output interface 314 could include a speaker 318. Alternatively, speaker 318 could be physically separate from WCD 300 and communicatively coupled to audio output interface 312 via a wired or wireless link. WCD 300 could also include a camera 320 that is operable to capture still images and/or video.

WCD 300 could further include a sensor system 322 that includes one or more sensors. The one or more sensors in sensor system 322 may be configured to provide an output that can indicate whether a user of WCD 300 is injured, incapacitated, or in a potentially dangerous environment. As one example, sensor system 322 could include a motion sensor that detects motion of WCD 300. The output of such a motion sensor could indicate a fall (e.g., based on a sudden acceleration downward) or could indicate that the user is incapacitated (e.g., if no motion is detected for a period of time). As another example, sensor system 322 could include a biometric sensor that monitors the heart rate, breathing patterns, or other biometric conditions of the user. The output of such a biometric sensor could indicate whether the user is incapacitated, in shock, injured, stressed or otherwise in need of assistance. As yet another example, sensor system 322 could include a chemical sensor that can detect the presence of dangerous chemicals in the environment and/or a radiation sensor that can detect the presence of dangerous radiation levels in the environment. The output of such environmental sensors could indicate whether the user is in a potentially hazardous environment. Other types of sensors could also be included in sensor system 322.

As shown in FIG. 6, WCD 300 includes a controller 330, which may be coupled to communications transceiver 302, GPS receiver 306, display 308, user input devices 310, audio input interface 312, audio output interface 314, camera 320, and sensor system 322. Controller 330 may be configured to control at least some of the functions of WCD 300, such as some or all of the functions described above with regard to FIGS. 2-5.

Controller 330 may be implemented as hardware, firmware, and/or software. In an exemplary embodiment, controller 330 includes a processor 332 and data storage 334. Data storage 334 could include random access memory (RAM), read-only memory (ROM), flash memory, one or more magnetically-encoded or optically-encoded disks, or any other type of non-transitory computer readable medium. Data storage 334 may store program instructions 336 that can be executed by processor 332 to cause controller 330 to perform functions. Such functions could include functions related to originating and receiving PTT calls, including standard PTT calls and emergency PTT calls. For example, program instructions 336 may include software for a PTT client, as well as software for detecting and recognizing one or more emergency triggers for originating emergency PTT calls. Data storage 334 may also store data or parameters that are used by program instructions 336. For example, data storage 334 may store a standard identifier 338 that identifies WCD 300 in standard PTT calls and an emergency identifier 340 that identifies WCD 300 in emergency PTT calls. In addition, data storage 334 may store an emergency talk group 334, which can be mapped to one or more destinations for an outgoing emergency PTT call, as well as standard talk groups that may be used for standard PTT calls.

In this way, controller 330 may be configured to: recognize a standard push-to-talk (PTT) call request, such as a predetermined interaction with user input devices 310; in response to a standard PTT call request, originate an outgoing standard PTT call, via communications transceiver 304, using standard identifier 338 to identify WCD 300; recognize an emergency trigger, for example, based on a button in user input devices 310 being actuated for at least a predetermined period of time or based on an output from sensor system 322; in response to the emergency trigger, originate an outgoing emergency PTT call, via communications transceiver 302, using emergency identifier 340 to identify WCD 300 and using emergency talk group 342 to specify the destination; and activate audio input interface 312 to capture audio and/or operate camera 320 to capture still images or video and include such audio, image, or video data in the outgoing emergency PTT call. Controller 330 may also be configured to determine a current location of WCD 300 (e.g., using GPS receiver 306) and include the current location of WCD 300 in the outgoing emergency PTT call.

In addition, controller 330 may be configured to register standard identifier 338, emergency identifier 340, emergency talk group 342, using signaling transmitted by communications transceiver 302. Controller 330 may be further configured to receive an incoming PTT call, via communications transceiver 302 and to generate (i) a standard alert indication, in response to the incoming PTT call identifying WCD 300 by standard identifier 338, and (ii) generate an emergency alert indication, in response to the incoming PTT call identifying WCD 300 by emergency identifier 340.

If WCD 300 receives an incoming emergency PTT call while engaged in a standard PTT call, controller 330 may be configured to control WCD 300 so that the emergency PTT call preempts the standard PTT call. Such preemption could involve controller 330 reserving audio output interface 314 and speaker 318 for audio received in the emergency PTT call. Thus, if WCD 330 receives audio from both the standard PTT call and the emergency PTT call, controller 330 may convey the audio from the emergency PTT call, instead of the audio from the standard PTT call, to audio output interface 314 for play out through speaker 318. Preemption could also involve controller 330 releasing the standard PTT call, through signaling transmitted by communications transceiver 302.

6. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A wireless communication device (WCD), comprising:
   a wireless transceiver; and
   a controller comprising a processor and data storage, said data storage storing a standard Uniform Resource Identifier (URI) and an emergency URI, wherein said controller is configured to:
   register said standard URI and said emergency URI using a server;
   recognize a standard push-to-talk (PTT) call request;
   in response to said standard PTT call request, originate an outgoing standard PTT call, via said wireless transceiver, using said standard URI to identify said WCD;
   recognize an emergency trigger; and
   in response to said emergency trigger, originate an outgoing emergency PTT call, via said wireless transceiver, using said emergency URI to identify said WCD.

2. The WCD of claim 1, wherein said controller is further configured to:
   receive an incoming PTT call, via said transceiver;

generate a standard alert indication, in response to said incoming PTT call identifying said WCD by said standard URI; and generate an emergency alert indication, in response to said incoming PTT call identifying said WCD by said emergency URI.

3. The WCD of claim 1, wherein said outgoing emergency PTT call is a PTT call to an emergency talk group, and wherein said controller is further configured to register said emergency talk group using said server.

4. The WCD of claim 1, wherein said controller is further configured to receive an incoming emergency PTT call while engaged in a standard PTT call, wherein said standard PTT call identifies said WCD by said standard URI and includes incoming standard-call audio, and wherein said incoming emergency PTT call identifies said WCD by said emergency URI and includes incoming emergency-call audio.

5. The WCD of claim 4, wherein said controller is further configured to release said standard PTT call in response to said incoming emergency PTT call.

6. The WCD of claim 4, further comprising an audio output interface, wherein said controller is further configured to convey said incoming standard-call audio to said audio output interface while engaged in said standard PTT call and, in response to said incoming emergency PTT call, to reserve said audio output interface for said incoming emergency-call audio.

7. The WCD of claim 1, further comprising an input device, wherein said controller is configured to recognize said emergency trigger in response to detecting a predetermined interaction with said input device.

8. The WCD of claim 7, wherein said input device comprises a button, and wherein said predetermined interaction with said input device comprises said button being actuated for at least a predetermined amount of time.

9. The WCD of claim 1, further comprising a sensor system configured to provide an output, wherein said controller is configured to recognize said emergency trigger in response to detecting a predetermined output from said sensor system.

10. The WCD of claim 9, wherein said sensor system comprises at least one of a motion sensor, a biometric sensor, a radiation sensor, and a chemical sensor.

11. The WCD of claim 1, wherein said controller is further configured to obtain a current location of said WCD in response to said emergency trigger and include said current location in said outgoing emergency PTT call.

12. The WCD of claim 1, further comprising an audio input interface configured to receive audio, wherein said controller is further configured to activate said audio input interface in response to said emergency trigger and to include audio received by said audio input interface in said outgoing emergency PTT call.

13. The WCD of claim 1, further comprising a video camera, wherein said emergency controller is further configured to activate said video camera in response to said emergency trigger and include video captured by said video camera in said outgoing emergency PTT call.

14. A method for a wireless communication device (WCD), wherein said WCD is operable to originate and receive push-to-talk (PTT) calls, said method comprising:
said WCD registering a standard Uniform Resource Identifier (URI) using a PTT server;
said WCD registering an emergency URI using said PTT server;
said WCD detecting an emergency trigger; and
in response to said emergency trigger, said WCD wirelessly transmitting signaling to said PTT server to originate an outgoing emergency PTT call, wherein said signaling includes said emergency URI.

15. The method of claim 14, wherein said signaling comprises a Session Initiation Protocol (SIP) INVITE message.

16. The method of claim 14, further comprising said WCD registering an emergency talk group using said PTT server, wherein said signaling identifies said emergency talk group.

17. A method for a wireless communication device (WCD), wherein said WCD is operable to originate and receive push-to-talk (PTT) calls, said method comprising:
said WCD registering a standard Uniform Resource Identifier (URI) using a PTT server;
said WCD registering an emergency URI using said PTT server;
said WCD becoming engaged in a standard PTT call, wherein said standard PTT call identifies said WCD by said standard URI;
while engaged in said standard PTT call, said WCD receiving an incoming emergency PTT call, wherein said incoming emergency PTT call identifies said WCD by said emergency URI; and
in response to said incoming emergency PTT call, said WCD wirelessly transmitting signaling to said PTT server to release said standard PTT call.

18. The method of claim 17, wherein said signaling comprises a Session Initiation Protocol (SIP) BYE message.

19. The method of claim 17, further comprising:
while engaged in said standard PTT, said WCD receiving incoming standard-call audio and conveying said incoming standard-call audio to an audio output interface; and
in response to said incoming emergency PTT call, said WCD receiving incoming emergency-call audio and conveying said incoming emergency-call audio, instead of said incoming standard-call audio, to said audio output interface.

* * * * *